United States Patent
Kim et al.

(10) Patent No.: US 7,519,045 B2
(45) Date of Patent: Apr. 14, 2009

(54) OPTIMAL DIRECTION-BASED FLOODING METHOD FOR MOBILE AD-HOC NETWORKS

(75) Inventors: Jae-Ho Kim, Daejeon (KR); Dae-Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 632 days.

(21) Appl. No.: 11/148,139

(22) Filed: Jun. 7, 2005

(65) Prior Publication Data

US 2006/0045065 A1     Mar. 2, 2006

(30) Foreign Application Priority Data

Sep. 1, 2004    (KR)  ........................ 10-2004-0069592

(51) Int. Cl.
     *H04L 12/28*      (2006.01)
(52) U.S. Cl. ........................ 370/351; 370/315; 455/41.2
(58) Field of Classification Search ........................ None
See application file for complete search history.

(56) References Cited

U.S. PATENT DOCUMENTS

| | | | | |
|---|---|---|---|---|
| 6,104,712 | A * | 8/2000 | Robert et al. ................ | 370/389 |
| 2002/0145978 | A1 | 10/2002 | Batsell et al. | |
| 2003/0124977 | A1 * | 7/2003 | Smith et al. ................... | 455/16 |
| 2004/0002336 | A1 * | 1/2004 | Wu et al. ..................... | 455/445 |
| 2004/0203380 | A1 * | 10/2004 | Hamdi et al. ............... | 455/41.2 |
| 2004/0233855 | A1 * | 11/2004 | Gutierrez et al. ............ | 370/252 |
| 2005/0041662 | A1 * | 2/2005 | Kuo et al. .................... | 370/389 |
| 2005/0190717 | A1 * | 9/2005 | Shu et al. ..................... | 370/328 |
| 2005/0197127 | A1 * | 9/2005 | Nakasaku et al. ........... | 455/445 |
| 2008/0095095 | A1 * | 4/2008 | Adachi et al. ............... | 370/315 |

FOREIGN PATENT DOCUMENTS

JP        2005-86643        3/2005

OTHER PUBLICATIONS

"Ad-hoc Routing Protocol using Directional Antennas" by Yuuichi Yokoyama, et al.; *Technical Report of IEICE*; 2001; vol. 101 No. 492, Abstract.

"Distributed broadcasting algorithms in ad hoc radio networks and experimental results" by Liangzhi Zou, et al.; 2003: vol. 2003, No. 32; www.ipsj.or.jp, Abstract.

"Optimized Flooding Protocol for Ad hoc Networks" by Vamsi K Paruchuri, et al.; Nov. 12, 2003.

* cited by examiner

*Primary Examiner*—Phirin Sam
(74) *Attorney, Agent, or Firm*—Blakely, Sokoloff, Taylor & Zafman LLP

(57) ABSTRACT

The optimal direction-based flooding method for relaying a broadcast message for mobile ad-hoc networks comprises (a) an original source node selecting a first relay node; (b) selecting a message relaying direction into an area divided by a predetermined interval; (c) relaying the broadcast message by selecting the first relay node set for each message relaying direction; and (d) selecting a next relay node and relaying the broadcast message received by the previously selected relay node. Duplicated broadcast message transmissions, and competition and collision among the nodes to obtain transmission media, are reduced by transmitting the broadcast message using a minimum number of nodes in a mobile ad-hoc network including nodes having limited resources.

13 Claims, 5 Drawing Sheets

OPTIMAL DIRECTION-BASED FLOODING METHOD FOR MOBILE AD-HOC NETWORKS

CROSS REFERENCE TO RELATED APPLICATION

This application claims priority to and the benefit of Korean Patent Application No. 10-2004-0069592, filed on Sep. 1, 2004, which is hereby incorporated by reference for all purposes as if fully set forth herein.

BACKGROUND OF THE INVENTION

1. Field of the Invention

The present invention relates to an optimal direction-based flooding method for mobile ad-hoc networks, and more particularly, to an optimal direction-based flooding method for effectively relaying a broadcast message for mobile ad-hoc networks.

2. Discussion of the Related Art

Recently, as network terminals have become smaller, a user's need for connecting to a network while on the move has increased, an age in which the computing resource of the terminal itself can sufficiently perform a router roll, has arrived, and technologies for connecting near network terminals with each other are thus needed.

An ad-hoc network was developed for military and rescue purposes, but now the ad-hoc network is being researched in various fields for commercial utilization. An ad-hoc network is an aggregation of wireless mobile hosts constructing a temporary network (Ad-hoc) without center-concentrated management or a standardized support service.

A mobile ad-hoc network represents a network for a radio communication area constructed by mobile terminals without a wired infrastructure network, and is able to construct an emergency rescue network in mountainous or war areas without a wired infrastructure base. Then, current data link technology is utilized to transmit and receive radio signals, and a mobile terminal of the mobile ad-hoc network functions as a host and a router. Herein, the development of router protocol, and technology for security problems of radio signals are needed.

More precisely, a mobile ad-hoc network is a self-built up network of ad-hoc nodes in an infrastructure-less environment, it needs no basic network device such as a base station, and the ad-hoc network needs peer-to-peer (P2P) communication among the ad-hoc nodes using a radio channels. Since a network topology of a mobile ad-hoc network can be varied due to the mobility of the ad-hoc nodes, the complexity of the network can be increased, but research of mobile ad-hoc networks is in progress because of the advantage of replacing the wired network with wireless technology.

The network topology varies more frequently in the mobile ad-hoc network than in a wired network because of the mobility of the nodes and the deficiency of batteries, and a broadcasting method is generally used for solving the problem in the routing and service protocol in the mobile ad-hoc network.

The prior art for decreasing the quantity of the broadcast messages in the broadcasting method are classified into probability-based, counter-based, topology-based, and position-based methods according to the information used.

The probability-based method is a method for determining whether to transmit the broadcast message probabilistically at the node which received the broadcast message. The counter-based method is a method for determining whether to transmit the broadcast message according to a number of repeatedly-received messages. The position-based method is a method for selecting, at a transmitting node, a relay node set by using coordinate information and distance between neighbor nodes, and for determining a transmitting sequence. The topology-based method is a method for exchanging topology information among nodes and selecting a relay node set using the topology information.

As to the prior art, US Patent application No. 20020145978A1 (filed in Oct. 10, 2002) entitled "MRP-Based Hybrid Routing For Mobile Ad Hoc Network" discloses an effective routing method in a mobile ad-hoc network.

The above-noted patent discloses contents by which duplicated re-relaying of the broadcast message and inefficient consumption of radio resources can be reduced by using information of 2-hop neighbor nodes and selecting a next relay node set in a network in which an overhead caused by periodic hello message exchanging can be reduced.

A simple broadcasting method is a flooding method.

The flooding method is a packet relaying method for broadcasting packets to a whole network. Because a routing protocol, a service searching protocol, and an address automatic set-up protocol essentially use the flooding method in a mobile ad-hoc network, the efficiency of the flooding method is an important element for determining the capability of the mobile ad-hoc network. Particularly, since every node in the ad-hoc network uses a shared radio channel and has the characteristic that wireless transmitting areas among neighbor nodes are superimposed, contention for the radio resources, packet collision, and degradation of network capability by duplication of the broadcast packet are considered as big problems.

The conventional flooding method has many problems in a mobile ad-hoc network which has nodes with limited resources because the conventional flooding method causes frequent broadcasting. More particularly, broadcasting by the conventional flooding method has duplicated message relaying and increases the occurrence of contention and collision among nodes using common media. Therefore, inefficient energy consumption and delays in transmitting the broadcast message occur, which are generally called broadcast storm problems.

SUMMARY OF THE INVENTION

The advantage of the present invention is to provide an optimal direction-based flooding method for reducing the number of duplicated broadcast message relays in a mobile ad-hoc network.

An additional advantage of the present invention is to provide an optimal direction-based flooding method for reducing inefficient consumption of wireless resources in a mobile ad-hoc network.

An optimal direction based flooding method relaying a broadcast message in a mobile ad-hoc network formed by nodes knowing self-position, includes: (a) an original source node selecting a first relay node; (b) selecting a message relaying direction to an area divided by a predetermined interval; (c) relaying the broadcast message by selecting a first relay node set provided in each message relaying direction; and (d) selecting a next relay node and relaying the broadcast message received by the previously selected relay node.

In (c), the message transmitted to the relay node set includes header information including a predetermined information field.

The information field includes position information of the original source node, direction information of a present node, relaying direction information, and address information fields of the first relay nodes.

The area divided by the predetermined interval is divided into 6 areas each of which has 60 degrees with respect to a coordinate system.

In the 6 areas, the broadcast message is transmitted in the same direction as that of the original broadcast message relay direction at a node which is apart from the original source node by an odd-number of hops, and the broadcast message is transmitted to two directions having ±60 degrees with respect to the original message advancing direction at a node which is apart from the original source node by an even-number of hops.

Additionally, (d) includes:

(d-1) determining the number of elements of a next relay node set;

(d-2) generating the broadcast message by selecting as many relay nodes as the previously determined number of elements; and (d-3) filtering the generated message and transmitting the message to the selected relay nodes.

Wherein, (d-1) above includes:

determining the number of elements of the next relay node set to be one when the broadcast message is received from the original source node;

determining the number of elements of the next relay node set to be two when the number of the relay node set field elements of the corresponding message is one.

determining the number of elements of the next relay node set to be one when the number of the relay node set field elements of the corresponding message is two.

In the above, (d-2) includes:

selecting a next relay node by using direction information, included in a relaying direction field of the received broadcast message; and establishing direction information of the present node, a relaying direction node set, and an address information field of the first relay nodes.

In the above, (d-3) includes:

transmitting the broadcast message when receiving no duplicated message while standing by for the broadcast message to be transmitted; and determining whether to transmit the broadcast message when a duplicated message is received during standing by for the broadcast message to be transmitted.

When the node which transmits the duplicated message is near to the relay node, and the duplicated message is relayed in the same direction, (d) can further include discarding the standby broadcast message.

A recording medium for the broadcast message structure having a header and a data field in a mobile ad-hoc network formed with nodes which have self-position information, includes: an original source node position information field, provided in the header field, and recording a coordinate of the original broadcast message transmitting node; a present node direction information field, provided in the header field, and recording a coordinate of the present node to which the broadcast message is to be transmitted; an optimal direction information field, provided in the header field, recording a transmitting direction information of the broadcast message transmitted by the original source node; and a relay node set field, provided in the header field, and including identification (ID) information of the nodes relaying the broadcast message among the nodes in the present node transmission range.

The identification (ID) information is address information of the first relay nodes.

The optimal direction field includes 6 sets of direction information which are 1 on 1 mapped sequentially with 6 relay nodes.

The previously mapped direction is input to the optimal direction field of the originally selected 6 relay nodes, and is not changed during the relaying of the broadcast message to the network.

Additional features of the invention will be set forth in the description which follows, and in part will be apparent from the description, or may be learned by practice of the invention.

BRIEF DESCRIPTION OF THE DRAWINGS

The accompanying drawings, which are included to provide a further understanding of the invention, and are incorporated in and constitute a part of this specification, illustrate embodiments of the invention, and together with the description serve to explain the principles of the invention.

DETAILED DESCRIPTION OF THE PREFERRED EMBODIMENT

Figure 1:
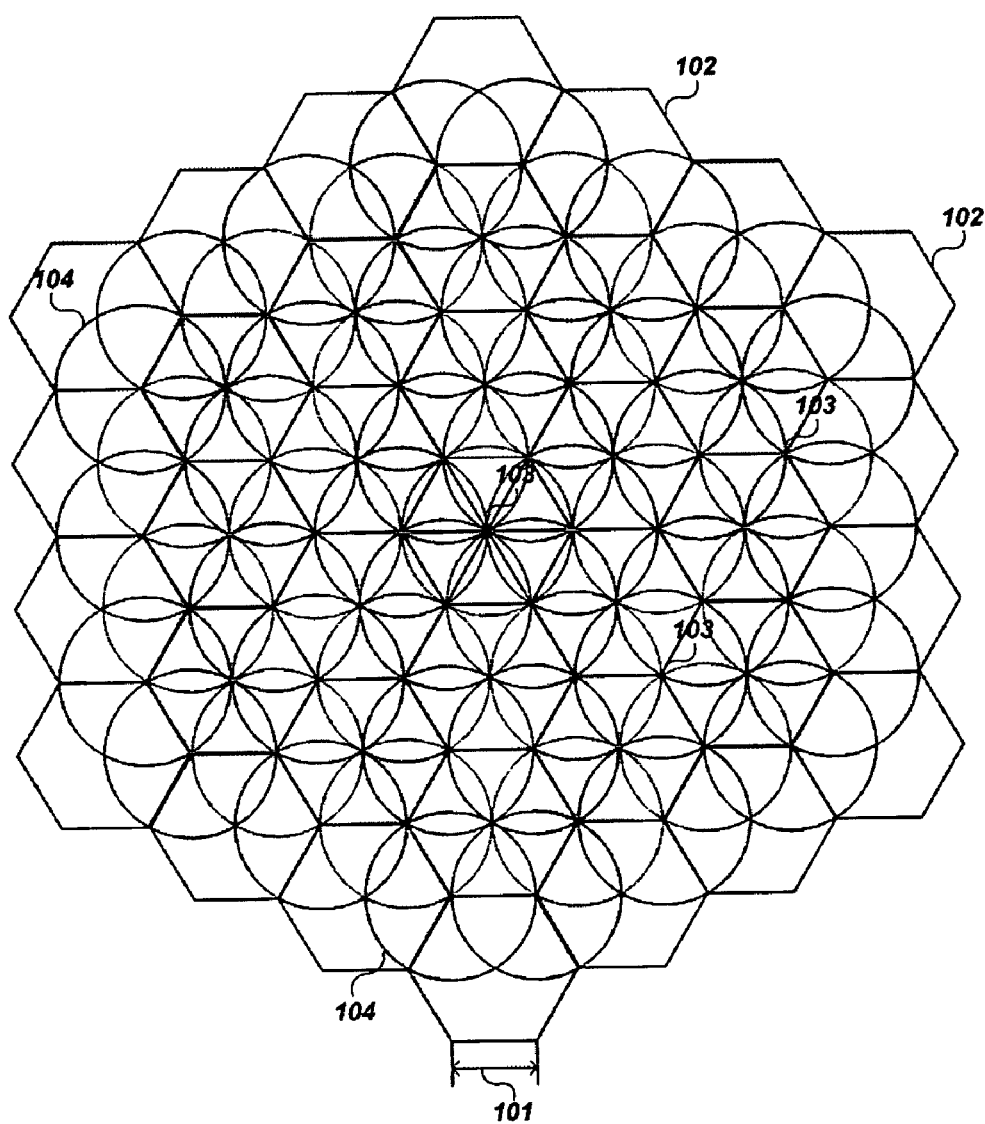
FIG. 1 shows a format of node arrangement for covering a network by a minimum number of nodes having an equal relaying range.

In the following detailed description, exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

In the drawings, illustrations of elements having no relation with the present invention are omitted in order to more clearly present the subject matter of the present invention. In the specification, the same elements are denoted by the same reference numerals even though they are depicted in different drawings.

An optimal direction-based flooding method for a mobile ad-hoc network according to an exemplary embodiment of the present invention will be explained, referring to the enclosed figures.

According to an exemplary embodiment of the present invention, an assumption is given such that each node is able to recognize its self-position by a specific position recognition system, and is also able to recognize position information of a 1-hop neighbor node by exchanging position information with the 1-hop neighbor node. Each node receiving the broadcast message selects the optimal relay node set by using the position information of a neighbor node and the optimal direction of the message, and the nodes included in the selected relay node set relay the broadcast message.

FIG. 1 shows a format of node arrangement for covering the network by a minimum number of nodes, each with the same transmission range.

The nodes are arranged as in FIG. 1 to cover the mobile ad-hoc network with a minimum number of nodes. Regular hexagons 102 have the transmission range 101 of each node as a side length, apexes 103 of the regular hexagons have nodes, and each circle 104 indicates the transmission range centered on each node.

Figure 2:
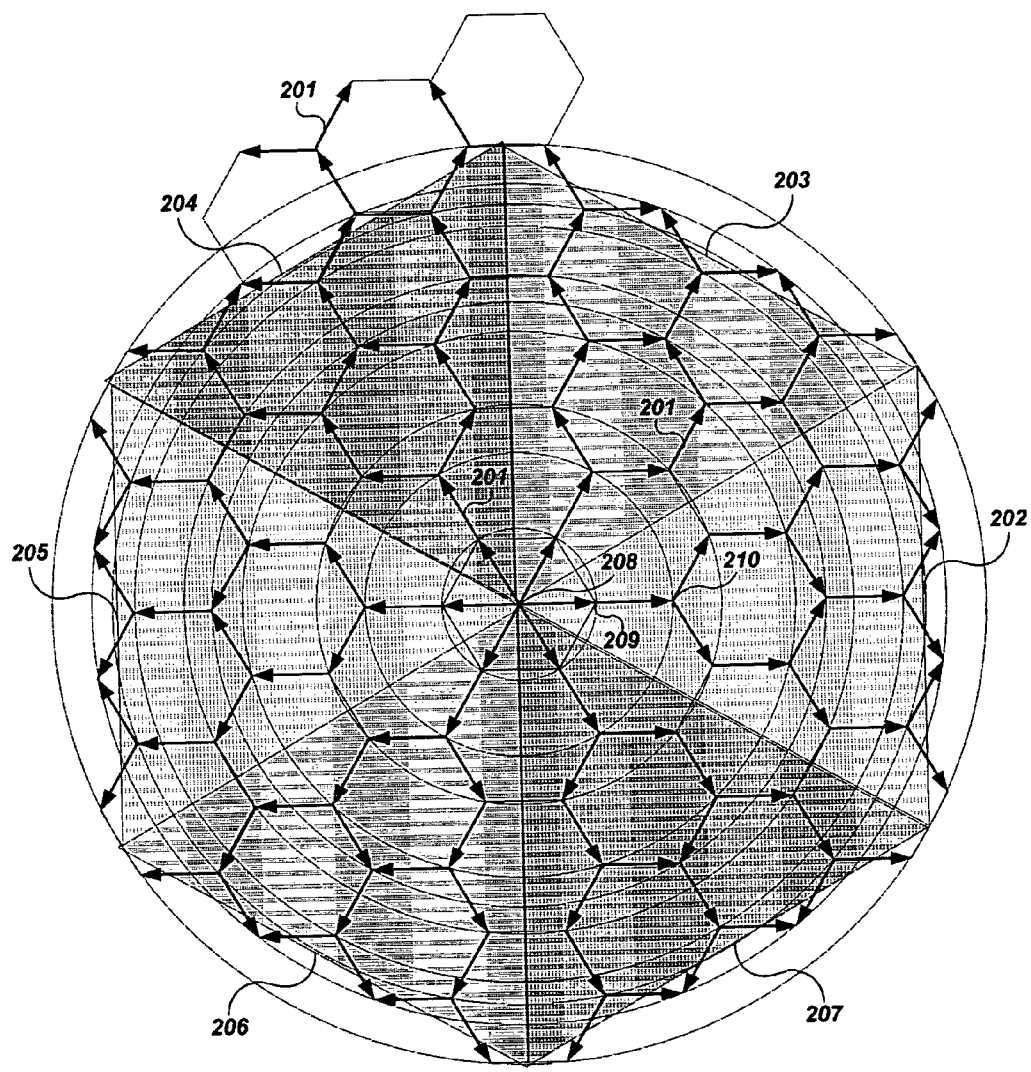
FIG. 2 shows a form of a broadcast message being relayed to the network.

FIG. 2 shows a form of the broadcast message transmitting to the network according to the exemplary embodiment of the present invention. More precisely, it shows how the broadcast message from the original source node 208 is transmitted to the whole network.

Referring to FIG. 2, the arrow 201 indicates the path and the direction of the transmitted broadcast message. The original broadcast message is transmitted to six areas 202 to 207, each of 60 degrees intervals. In the node 209, which is an odd-number of hops apart from the original source node 208, the broadcast message is transmitted in the same direction as the original transmission. On the contrary, in the node 210, which is an even-number of hops apart from the original source node 208, the broadcast message is transmitted in two directions of +60 degrees and −60 degrees of the original message advancing direction.

Figure 3:
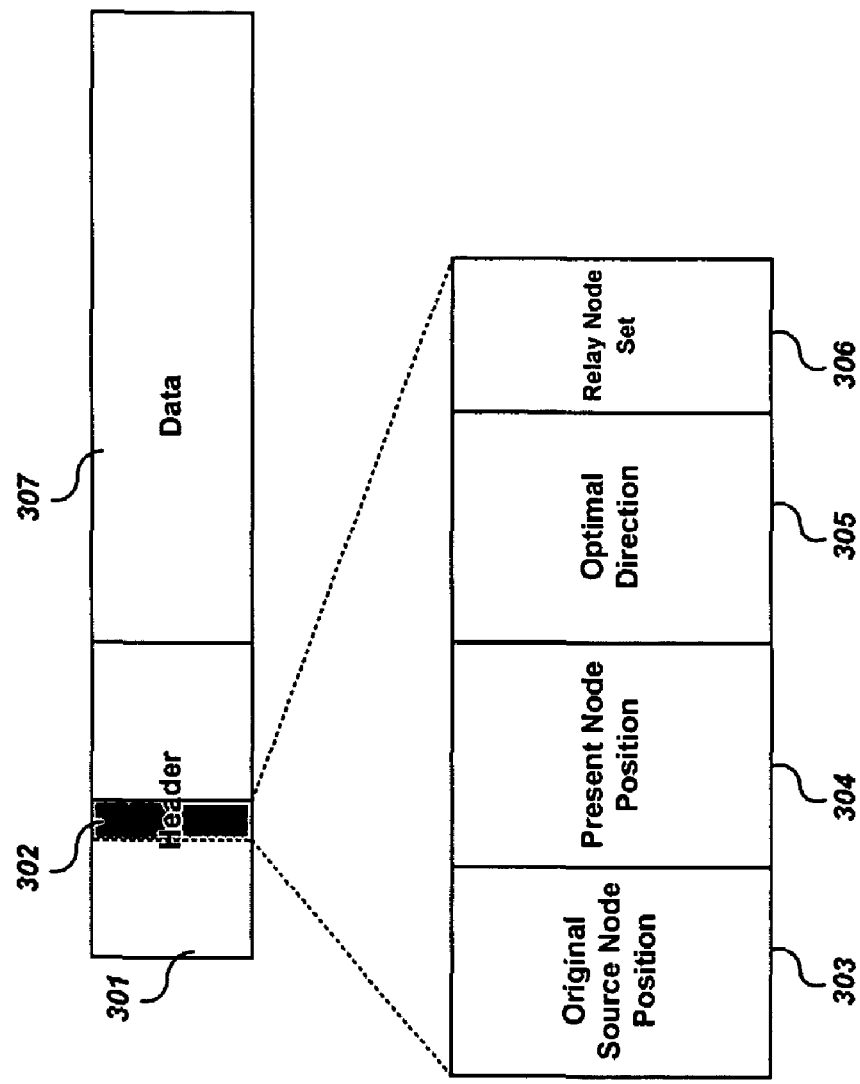
FIG. 3 shows information included in a header of the broadcast message according to an exemplary embodiment of the present invention.

FIG. 3 shows information 302 included in a header 301 of the broadcast message according to the exemplary embodiment of the present invention.

Referring to FIG. 3, in the broadcast message including the header 301 and data 307, the information 302 included in the header 301 comprises a coordinate field 303 of the original broadcast message transmitting node, a coordinate field 304 of the present node to which the broadcast message is to be transmitted, an optimal direction field 305, and a relay node set field 306.

A coordinate of each node is input in the original source node field 303 and the coordinate field 304 of the present node.

Information of the message transmitting direction is stored in the optimal direction field 305. Herein, the optimal direction field 305 of the broadcast message transmitted by the original source node includes six sets of direction information which are 1 on 1 mapped to the six relay nodes sequentially. The previously mapped direction is input in the optimal direction field 305 of the originally selected six relay nodes, and the direction is not changed during the transmission of the broadcast message to the network.

The relay node set field 306 includes identification information of the nodes that relay the corresponding broadcast message among the nodes in the present transmission range.

Figure 4:
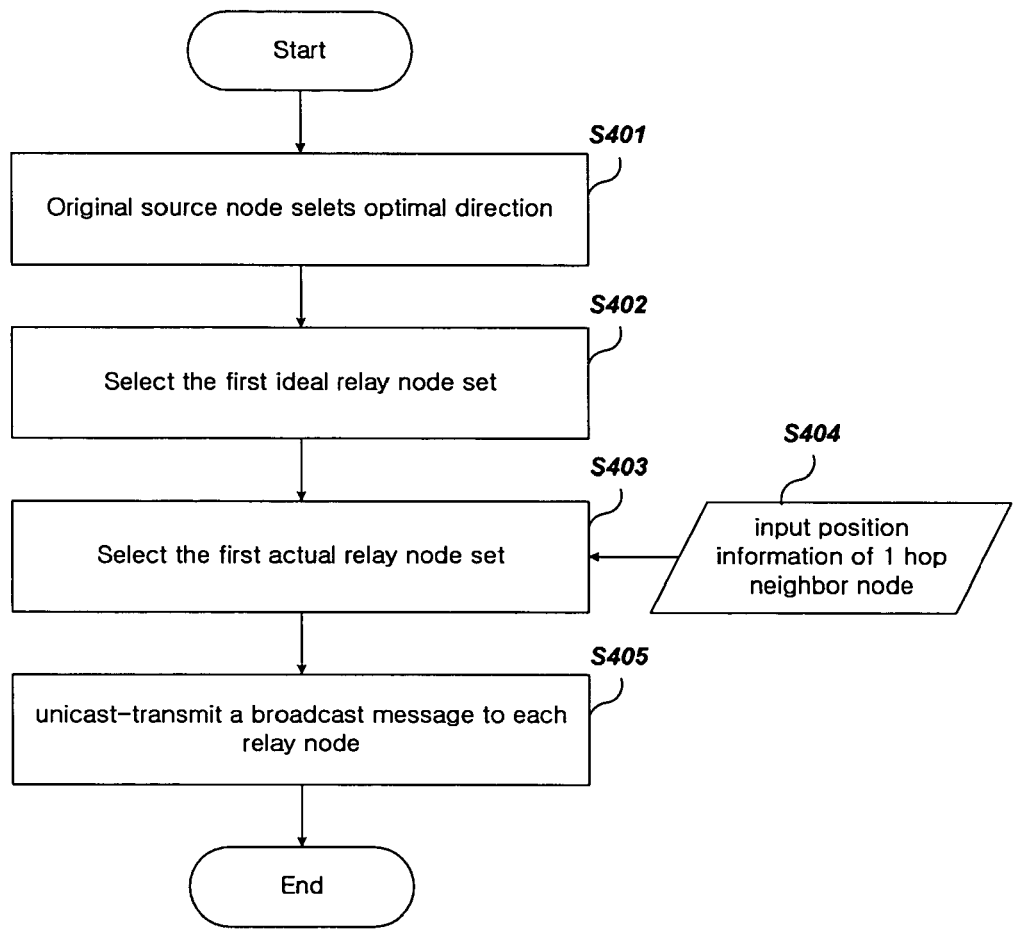
FIG. 4 is a flowchart of a flooding method for relaying the broadcast message in an original source node according to the exemplary embodiment of the present invention.

FIG. 4 is a flowchart of the flooding method for transmitting the broadcast message in the original source node according to the exemplary embodiment of the present invention. More precisely, it shows the method for selecting the original relay node set in the original source node and transmitting the broadcast message.

Referring to FIG. 4, the original source node determines the message transmitting direction to the six areas of 60 degrees intervals in step S401. That is, the original source node selects the six optimal directions $\alpha_1$ to $\alpha_6$, where $\alpha_{i+1} = \alpha_i + 1/3\pi$, ($1 \leq i \leq 6$, i is an integer).

An ideal position of the relay node is evaluated using each message transmitting direction. In detail, the first ideal relay node set $\{m_1$ to $m_6\}$ is selected using each message transmitting direction, where the coordinate of $m_i$ is given to be $(S_x+\gamma\cdot\cos(\alpha_i), S_y+\gamma\cdot\sin(\alpha_i))$, $(S_x, S_y)$ indicates the coordinate of the original source node, and $\gamma$ indicates the transmission range of the node.

The original source node uses the position information of its 1-hop neighbor node in step S404 to select six actual relay nodes that are nearest to the ideal relay node positions in step S403. In other words, the original source node selects the actual relay node set $\{n_1$ to $n_6\}$, where $n_i$ is the coordinate of the 1-hop neighbor node nearest to $m_i$.

The original source node generates a broadcast message and unicast-transmits the same in step S405. In detail, the original source node unicast-transmits the broadcast message to each relay node $\{n_1$ to $n_6\}$, then the original source node inputs the self-position information in the original source node coordinate field 303 and the present node coordinate field 304, inputs $\alpha_i$ mapped with each node $n_i$ in the optimal direction field 305, and inputs a NULL in the relay node set field 306.

Figure 5:
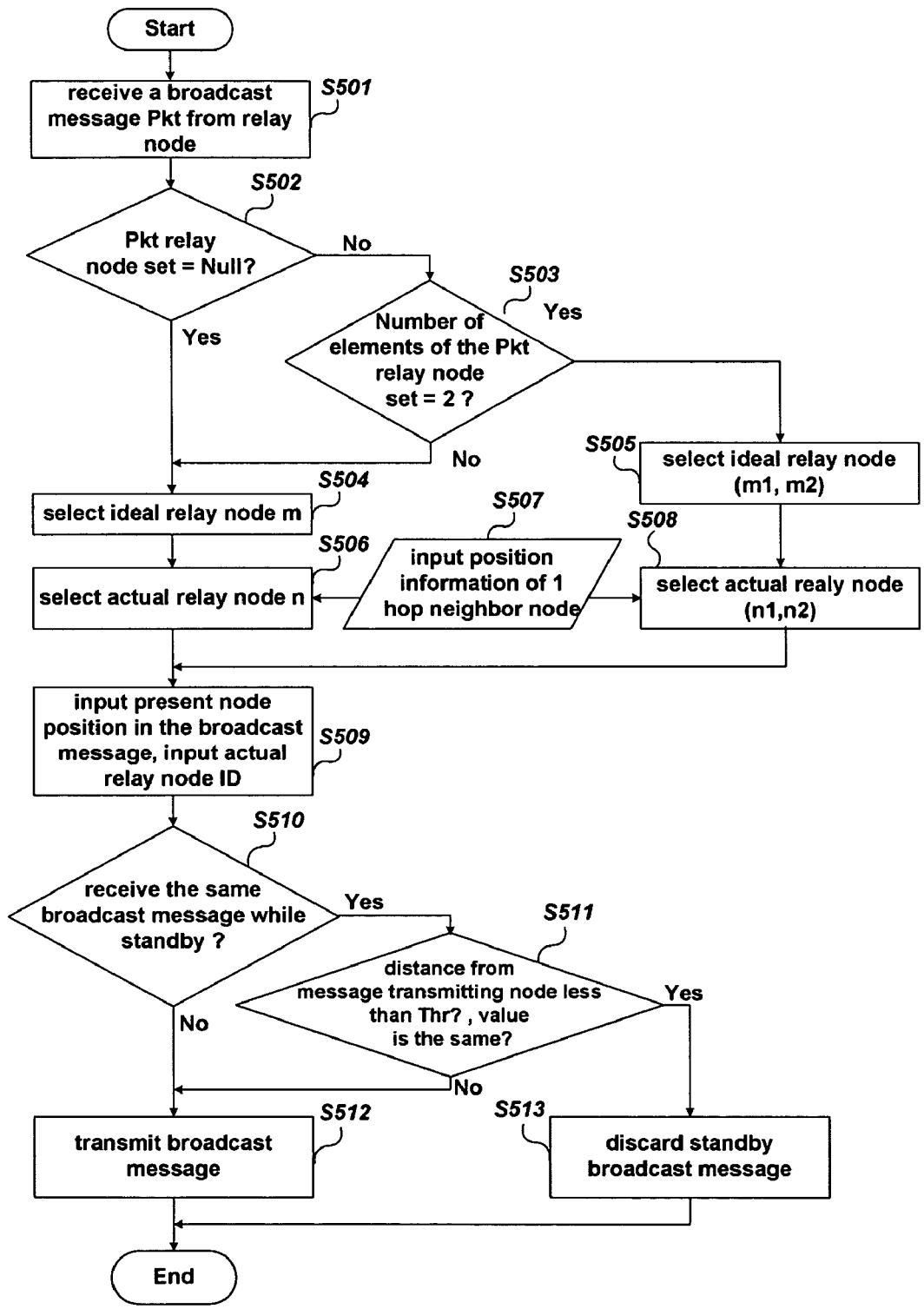
FIG. 5 is a flowchart of a flooding method for relaying the broadcast message in a relay node according to the exemplary embodiment of the present invention.

FIG. 5 is a flowchart of the flooding method for transmitting the broadcast message in the relay node according to the exemplary embodiment of the present invention. More precisely, it shows the flooding method in which the node selected as the relay node selects the next relay node and transmits the broadcast message using the header information of the received broadcast message.

Referring to FIG. 5, when the relay node receives the broadcast message Pkt in step S501, the relay node tests whether the corresponding broadcast message Pkt is transmitted from the original source node in step S502 to thus test whether the broadcast message is NULL.

When the corresponding message is not received from the original source node, the relay node tests whether the number of elements of the relay node set field of the corresponding message is two to thus determine the number of relay nodes to be selected next in step S503. For example, the number of elements of the next relay node set is determined as one when the broadcast message is received from the original source node, the number of elements of the next relay node set is determined as two when the number of elements of the relay node set field of the corresponding message is one, and the number of elements of the next relay node set is determined as one when the number of elements of the relay node set field of the corresponding message is two.

When the number of relay nodes to be selected is given to be not 2 but 1, the ideal relay node m is selected in step S504, and the actual relay node n is selected in step S506 according to the information of the 1-hop neighbor position information in step S507.

In the previous step of S504, m is given as $(C_x+\gamma\cdot\cos(\alpha), C_y+\gamma\cdot\sin(\alpha))$, where $(C_x, C_y)$ indicates the coordinate of the present node, $\gamma$ indicates the transmission range of the node, and $\alpha$ indicates the optimal direction received from the previous node. In the previous step of S506, the coordinate of n indicates the 1-hop neighbor node nearest to m.

When the number of relay nodes to be selected is 2 in the previous step S503, the ideal relay node $(m_1, m_2)$ is selected in step S505, and the actual relay node $(n_1, n_2)$ is selected in accordance with the 1-hop neighbor position information in step S507.

In the previous step of S505, $m_1$ is defined to be $(C_x+\gamma\cdot\cos(\alpha+\pi/3), C_y+\gamma\cdot\sin(\alpha+\pi/3))$, and $m_2$ is $(C_x+\gamma\cdot\cos(\alpha-\pi/3), C_y+\gamma\cdot\sin(\alpha-\pi/3))$, where $(C_x, C_y)$ indicates the coordinate of the present node, $\gamma$ indicates the transmission range of the node, and $\alpha$ indicates the optimal direction received from the previous node. In the previous step of S508, the coordinate of the actual relay node $(n_1, n_2)$ indicates the 1-hop neighbor node nearest to the ideal relay node $(m_1, m_2)$.

The information of the selected relay node set and the coordinate of the present node are input in the header of the broadcast message in step S509. That is, the present node position is input in the present node coordinate field 304 of the broadcast message, and the identification information of the actual relay node $n_i$ is input in the relay node set field 306.

The relay node tests whether the relay node receives the same broadcast message during standby so as to transmit a corresponding message in step S510.

When the corresponding relay node receives the same message, the relay node tests whether the node transmitting the corresponding message is near and whether the transmitting direction is the same in step S511. In detail, the relay node tests whether the distance from the node transmitting the corresponding message is less than a standard value Thr, and whether the value α for the optimal direction of the transmitting node and the present node is the same.

The relay node transmits the broadcast message in step S512 when the tests in steps S510 and S511 are found to be false. The standby broadcast message is discarded in step S513 when the test in step S511 is true, that is, when the node transmitting the duplicated message is near to the relay node and the duplicated message is transmitted in the same direction.

According to the exemplary embodiment of the present invention, in order to reduce duplicated broadcast messages in a mobile ad-hoc network, the optimal direction for the broadcast message transmission is evaluated in the mobile ad-hoc network, the broadcast message is transmitted to the optimal direction evaluated in the mobile ad-hoc network, the optimal relay node set is selected based on the result of the evaluated optimal transmission direction for the broadcast message, and a duplicated broadcast message among the nodes selected as the relay node set is filtered.

Consequently, the described broadcast storm problem of the prior art can be solved by controlling a minimum number of nodes to relay the broadcast message and reducing the number of duplicated transmissions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

According to the present invention, duplicated broadcast message transmissions, and contention and collision among the nodes to obtain transmission media, can be reduced by transmitting the broadcast message using a minimum number of nodes in a mobile ad-hoc network including nodes having limited resources.

In addition, energy consumption for the broadcast message transmission and time consumption for transmitting the message to the whole network can be minimized.

What is claimed is:

1. An optimal direction based flooding method for relaying a broadcast message in a mobile ad-hoc network formed by nodes knowing self-position, the method comprising;
   (a) an original source node selecting a first relay node;
   (b) selecting a message relaying direction to an area divided by a predetermined interval;
   (c) selecting a first relay node set provided in each message relaying direction, and relaying the broadcast message to a selected relay node;
   (d) selecting a next relay node and relaying the broadcast message received by the previously selected relay node;
   (d-1) determining the number of elements of a next relay node set;
   (d-2) generating the broadcast message by selecting as many relay nodes as the previously determined number of elements; and
   (d-3) transmitting the generated message to the selected relay nodes.

2. The optimal direction based flooding method of claim 1, wherein in (c), the message transmitted to the relay node set includes header information including a predetermined information field.

3. The optimal direction based flooding method of claim 2, wherein the information field includes position information of the original source node, position information of a present node, relaying direction information, and address information fields of the first relay nodes.

4. The optimal direction based flooding method of claim 1, wherein the area divided by the predetermined interval includes 6 areas each of which has 60 degrees.

5. The optimal direction based flooding method of claim 4, wherein, in the 6 areas, the broadcast message is transmitted in the same direction as that of the original broadcast message relay direction at a node which is apart from the original source node by an odd-number of hops, and the broadcast message is transmitted in two directions having ±60 degrees with respect to the original message advancing direction at a node which is apart from the original source node by an even-number of hops.

6. The optimal direction based flooding method of claim 1, wherein (d-3) further includes filtering the generated message.

7. The optimal direction based flooding method of claim 6, wherein (d-1) comprises determining the number of elements of the next relay node set to be one when the broadcast message is received from the original source node.

8. The optimal direction based flooding method of claim 6, wherein (d-1) comprises determining the number of elements of the next relay node set to be two when the number of the relay node set field elements of the corresponding message is one.

9. The optimal direction based flooding method of claim 6, wherein (d-1) comprises determining the number of elements of the next relay node set to be one when the number of the relay node set field elements of the corresponding message is two.

10. The optimal direction based flooding method of claim 6, wherein (d-2) comprises:
   selecting a next relay node by using direction information included in a relaying direction field of the received broadcast message; and
   establishing position information of the present node, a relaying direction node set, and an address information field of the first relay nodes.

11. The optimal direction based flooding method of claim 6, wherein (d-3) comprises transmitting the broadcast message when receiving no duplicated message while standing by for the broadcast message to be transmitted.

12. The optimal direction based flooding method of claim 6, wherein (d-3) comprises determining whether to transmit the message when the duplicated message is received while standing by for the broadcast message to be transmitted.

13. The optimal direction based flooding method of claim 12, wherein (d) further includes discarding the standby broadcast message when the node which transmits the duplicated message is near to the relay node and the duplicated message is relayed in the same direction.

* * * * *